(No Model.)

F. H. IRONS.
PNEUMATIC TIRE.

No. 494,003. Patented Mar. 21, 1893.

WITNESSES:
F. McArdle
C. Sedgwick

INVENTOR
F. H. Irons
BY Munn & Co
ATTORNEYS.

THE NORRIS PETERS CO., PHOTO-LITHO., WASHINGTON, D. C.

UNITED STATES PATENT OFFICE.

FOSTER H. IRONS, OF TOLEDO, OHIO.

PNEUMATIC TIRE.

SPECIFICATION forming part of Letters Patent No. 494,003, dated March 21, 1893.

Application filed May 28, 1892. Serial No. 434,709. (No model.)

*To all whom it may concern:*

Be it known that I, FOSTER H. IRONS, of Toledo, in the county of Lucas and State of Ohio, have invented a new and Improved Pneumatic Tire and Method of Forming the Same, of which the following is a full, clear, and exact description.

My invention relates to improvements in pneumatic tires such as are used upon bicycle wheels; and the object of my invention is to produce a simple and effective pneumatic tire which, when punctured, will automatically heal so that no air can escape.

It is well understood that the great objection to pneumatic tires is that they are quite liable to collapse by reason of a puncture, and by my improved construction this difficulty is avoided without in any way injuring the flexibility of the tire.

To this end my invention consists in a pneumatic tire and in a method of forming the same, which will be hereinafter described and claimed.

Reference is to be had to the accompanying drawings, forming a part of this specification, in which similar figures of reference indicate corresponding parts in all the views.

Figure 2:
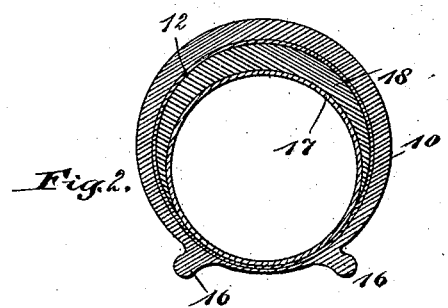
Figure 1:
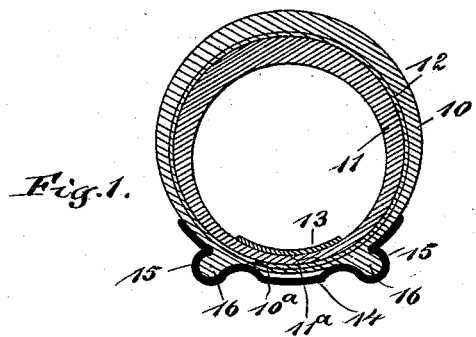
Figure 3:
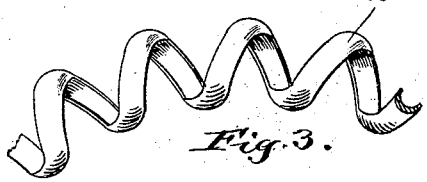
Figure 4:
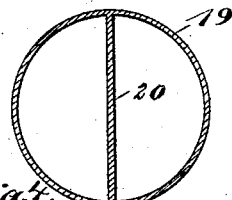

Figure 1 is a cross section of the tire embodying my invention. Fig. 2 is a cross section of a slightly modified form having an inflated inner tube. Fig. 3 is a broken perspective view, on a reduced scale, of one of the tire tubes, showing the manner in which it is molded; and Fig. 4 is a cross section of a form of inflated center tube which is especially adapted for use within the tire.

The outer hollow tube 10 is formed of rubber, and within it is an inner tube 11 which is adapted to be filled with air in the usual way, the inner tube being inclosed by a bandage 12 of linen, canvas, or other fabric, the fabric being for the purpose of preventing it from bursting. The tubes 10 and 11 are split on one side and the adjacent edges of each tube cemented together when the tire is formed, and before the tubes are made into the tire they are molded in spiral form, as shown in Fig. 3, and when the tire is made, the spiral is straightened out and the tubes fastened in position. It will thus be seen that the tendency of the tubes will be to resume their original position or shape, and hence, when they are straightened out, they will, in the effort to get back into the original shape, contract and condense the rubber, so that if either tube is punctured the aperture will be immediately closed by the pressure of the adjacent parts of the rubber, and consequently no air can escape. The cemented edges of the tubes are arranged on the inner side of the tire, as shown at 10ª and 11ª in Fig. 1, and this portion of the tire is re-inforced by a strip of rubber or other suitable material 13, which is cemented within the tube 11 and is made to fit snugly over the joint. The tire is held in a wheel rim or felly 14, which may be of any usual shape, but it is provided with parallel circumferential sockets 15, the entrances to which are from the outer side of the rim, and these entrances are narrower than the body of the socket. The tire has the exterior tube 10 provided with parallel ribs 16, which are adapted to fit the sockets 15, and which are large enough so that they must be compressed to be forced into the sockets, and the expansion of the material, after the ribs are inserted, serves to hold the ribs and tires in place.

If desired the tire may be provided with the ordinary center rubber tube 17, as shown in Fig. 2, and in this case a re-inforcing strip of rubber 18, of segmental cross section, is placed over the outer side of the center tube and between it and the tube 10, the surface between the strip 18 and tube 10 being covered by a bandage 12, as already described, this bandage being of the usual kind and extending around the strip 18 and the center tube. A preferable form of center tube is shown in Fig. 4, and consists of a main tube 19, of rubber and a central longitudinal web 20, also of rubber. The tube is normally inflated on one or both sides of the web, but when either side of the tube is punctured, the other side of the tube may be inflated to a greater extent and the web 20 will stretch out and take the place of the punctured side of the tube.

It will be understood that in forming the tire with an exterior and an inner tube, either the outer or inner tube may be made in the manner described, or both may be formed in this way with good results.

Having thus described my invention, I claim as new and desire to secure by Letters Patent—

1. The herein described method of forming pneumatic tires, which consists in molding the rubber tubes of the tire in a spiral shape, and then straightening the tubes out and forming them into a tire, substantially as described.

2. The combination, with the concentric tubes, each tube having a joint in its inner side, of a re-inforcing strip held within the inner tube and arranged to cover the joint, substantially as described.

FOSTER H. IRONS.

Witnesses:
GEO. L. IRONS,
RALPH S. HOLBROOK.